(12) United States Patent
Taniyama

(10) Patent No.: US 7,423,820 B2
(45) Date of Patent: Sep. 9, 2008

(54) IMAGING LENS

(75) Inventor: Minoru Taniyama, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/717,134

(22) Filed: Mar. 13, 2007

(65) Prior Publication Data

US 2007/0217034 A1 Sep. 20, 2007

(30) Foreign Application Priority Data

Mar. 14, 2006 (JP) ............... P2006-069226

(51) Int. Cl.
*G02B 1/00* (2006.01)
(52) U.S. Cl. ................... 359/791; 359/792
(58) Field of Classification Search ............ 359/321, 359/237, 238, 240, 245, 252, 791, 792, 779, 359/780, 772
See application file for complete search history.

(56) References Cited

U.S. PATENT DOCUMENTS

2005/0237633 A1* 10/2005 Nagai et al. ............ 359/785

FOREIGN PATENT DOCUMENTS

| JP | 2002-221659 A | 8/2002 |
| JP | 2004-302058 A | 10/2004 |
| JP | 2005-173319 A | 6/2005 |
| JP | 2005-227755 A | 8/2005 |
| JP | 2005-292235 A | 10/2005 |

\* cited by examiner

*Primary Examiner*—Timothy J Thompson
(74) *Attorney, Agent, or Firm*—Birch, Stewart, Kolasch & Birch, LLP

(57) ABSTRACT

An imaging lens is provided and includes: in order from an object side of the imaging lens, a first lens having a convex surface directed to the object side on an optical axis and having a positive power; an aperture diaphragm placed between a top position of an object-side surface of the first lens and a position of an image-side surface of the first lens on the optical axis; a second lens having a meniscus shape with a concave surface directed to the object side on the optical axis; and a third lens having a meniscus shape with a convex surface directed to the object side on the optical axis. Further, the imaging lens satisfies specific conditional expressions.

22 Claims, 23 Drawing Sheets

FIG. 8

| EXAMPLE 1: LENS DATA ||||| 
|---|---|---|---|---|
| Si (SURFACE NUMBER) | Ri (RADIUS OF CURVATURE) | Di (SPACING) | Ndj (REFRACTIVE INDEX) | vdj (ABBE NUMBER) |
| 0 (APERTURE DIAPHRAGM) | 0.000 | −0.18 | | |
| *1 | 1.982 | 1.01 | 1.509 | 56 |
| *2 | 79.491 | 0.97 | | |
| *3 | −1.248 | 0.78 | 1.608 | 25.2 |
| *4 | −2.419 | 0.32 | | |
| *5 | 1.817 | 1.15 | 1.509 | 56 |
| *6 | 2.495 | 0.70 | | |
| 7 | 0.000 | 0.30 | 1.516 | 64.1 |
| 8 | 0.000 | 0.84 | | |

(*ASPHERIC SURFACE)          (f=4.92, FNO=2.8, bf=1.74, TL=5.97, lh=2.8)

FIG. 9

| EXAMPLE 1: ASPHERIC DATA | | | | |
|---|---|---|---|---|
| ASPHERIC COEFFICIENT | SURFACE NUMBER | | | |
| | FIRST SURFACE | SECOND SURFACE | THIRD SURFACE | FOURTH SURFACE |
| K | 1.066E+00 | −9.999E+01 | −4.245E+00 | −6.258E−01 |
| $A_3$ | 7.664E−05 | −5.000E−03 | −4.214E−02 | −4.715E−02 |
| $A_4$ | −1.321E−03 | −2.259E−03 | −2.021E−01 | −6.278E−02 |
| $A_5$ | −1.885E−02 | −3.367E−02 | 2.790E−03 | 2.057E−02 |
| $A_6$ | 9.854E−03 | −9.323E−03 | 8.152E−02 | 3.640E−02 |
| $A_7$ | 1.068E−02 | 2.645E−02 | 5.285E−02 | 3.120E−03 |
| $A_8$ | −1.040E−02 | 2.405E−02 | −1.425E−02 | −4.550E−03 |
| $A_9$ | −6.508E−03 | −7.222E−02 | −5.048E−02 | 8.667E−04 |
| $A_{10}$ | 7.546E−04 | 2.623E−02 | 8.414E−03 | −1.115E−04 |
| | FIFTH SURFACE | SIXTH SURFACE | | |
| K | −6.360E+00 | 4.142E−01 | | |
| $A_3$ | −1.495E−02 | 2.446E−02 | | |
| $A_4$ | −5.246E−02 | −1.202E−01 | | |
| $A_5$ | 1.395E−02 | 2.749E−02 | | |
| $A_6$ | 1.108E−02 | 1.259E−02 | | |
| $A_7$ | −8.413E−04 | −5.285E−03 | | |
| $A_8$ | −1.989E−03 | −1.383E−03 | | |
| $A_9$ | −3.585E−04 | 9.580E−04 | | |
| $A_{10}$ | 2.675E−04 | −1.521E−04 | | |

FIG. 10

| EXAMPLE 2: LENS DATA | | | | |
|---|---|---|---|---|
| Si (SURFACE NUMBER) | Ri (RADIUS OF CURVATURE) | Di (SPACING) | Ndj (REFRACTIVE INDEX) | vdj (ABBE NUMBER) |
| 0 (APERTURE DIAPHRAGM) | 0.000 | −0.05 | | |
| *1 | 1.979 | 0.75 | 1.532 | 55.4 |
| *2 | 37.933 | 0.70 | | |
| *3 | −1.405 | 0.58 | 1.604 | 27.2 |
| *4 | −2.373 | 0.36 | | |
| *5 | 1.314 | 0.80 | 1.509 | 56 |
| *6 | 1.589 | 0.70 | | |
| 7 | 0.000 | 0.30 | 1.516 | 64.1 |
| 8 | 0.000 | 0.89 | | |

(*ASPHERIC SURFACE)  (f=4.00, FNO=2.8, bf=1.78, TL=4.98, Ih=2.8)

FIG. 11

| EXAMPLE 2: ASPHERIC DATA | | | | |
|---|---|---|---|---|
| ASPHERIC COEFFICIENT | SURFACE NUMBER | | | |
| | FIRST SURFACE | SECOND SURFACE | THIRD SURFACE | FOURTH SURFACE |
| K | 1.429E+00 | −4.345E+01 | −8.848E+00 | 1.040E+00 |
| $A_3$ | −2.200E−03 | −2.504E−02 | −7.395E−02 | −6.733E−02 |
| $A_4$ | 8.042E−03 | 3.702E−02 | −2.596E−01 | −1.116E−01 |
| $A_5$ | −5.639E−02 | −7.518E−02 | 4.375E−02 | 5.082E−02 |
| $A_6$ | 5.854E−03 | −2.987E−02 | 1.914E−01 | 9.736E−02 |
| $A_7$ | 3.546E−02 | 8.223E−02 | 1.430E−01 | 2.663E−02 |
| $A_8$ | 8.752E−03 | 8.242E−02 | −3.429E−02 | −7.220E−03 |
| $A_9$ | 1.061E−02 | −2.156E−01 | −1.665E−01 | −1.363E−04 |
| $A_{10}$ | −6.171E−02 | 7.254E−02 | 3.643E−02 | −1.011E−02 |
| | FIFTH SURFACE | SIXTH SURFACE | | |
| K | −3.856E+00 | −7.517E−01 | | |
| $A_3$ | −3.426E−02 | 1.432E−02 | | |
| $A_4$ | −8.603E−02 | −1.778E−01 | | |
| $A_5$ | 2.314E−02 | 5.856E−02 | | |
| $A_6$ | 2.388E−02 | 2.616E−02 | | |
| $A_7$ | −4.190E−04 | −1.288E−02 | | |
| $A_8$ | −4.648E−03 | −3.810E−03 | | |
| $A_9$ | −1.006E−03 | 3.058E−03 | | |
| $A_{10}$ | 6.619E−04 | −5.406E−04 | | |

FIG. 12

| EXAMPLE 3: LENS DATA ||||||
|---|---|---|---|---|
| Si (SURFACE NUMBER) | Ri (RADIUS OF CURVATURE) | Di (SPACING) | Ndj (REFRACTIVE INDEX) | vdj (ABBE NUMBER) |
| 0 (APERTURE DIAPHRAGM) | 0.000 | −0.13 | | |
| *1 | 1.994 | 0.94 | 1.509 | 56 |
| *2 | −100.485 | 1.00 | | |
| *3 | −1.103 | 0.80 | 1.608 | 25.2 |
| *4 | −2.228 | 0.33 | | |
| *5 | 1.919 | 1.29 | 1.509 | 56 |
| *6 | 3.135 | 0.70 | | |
| 7 | 0.000 | 0.30 | 1.516 | 64.1 |
| 8 | 0.000 | 0.87 | | |

(*ASPHERIC SURFACE)          (f=4.97, FNO=2.8, bf=1.77, TL=6.13, Ih=2.8)

FIG. 13

| EXAMPLE 3: ASPHERIC DATA | | | | |
|---|---|---|---|---|
| ASPHERIC COEFFICIENT | SURFACE NUMBER | | | |
| | FIRST SURFACE | SECOND SURFACE | THIRD SURFACE | FOURTH SURFACE |
| K | 9.587E−01 | 3.276E+01 | −2.743E+00 | −1.736E−01 |
| $A_3$ | −1.117E−04 | −3.275E−03 | −4.078E−02 | −4.554E−02 |
| $A_4$ | −4.345E−03 | −8.697E−03 | −2.167E−01 | −6.560E−02 |
| $A_5$ | −1.623E−02 | −3.863E−02 | −4.902E−03 | 2.173E−02 |
| $A_6$ | 1.102E−02 | −1.516E−02 | 7.925E−02 | 3.699E−02 |
| $A_7$ | 9.272E−03 | 2.588E−02 | 5.353E−02 | 2.770E−03 |
| $A_8$ | −1.264E−02 | 2.880E−02 | −1.210E−02 | −5.010E−03 |
| $A_9$ | −6.637E−03 | −6.625E−02 | −4.797E−02 | 8.544E−04 |
| $A_{10}$ | −1.133E−03 | 1.775E−02 | 1.034E−02 | 5.362E−04 |
| | FIFTH SURFACE | SIXTH SURFACE | | |
| K | −9.562E+00 | 6.251E−01 | | |
| $A_3$ | 8.311E−03 | 3.212E−02 | | |
| $A_4$ | −5.392E−02 | −1.145E−01 | | |
| $A_5$ | 1.237E−02 | 2.729E−02 | | |
| $A_6$ | 1.068E−02 | 1.243E−02 | | |
| $A_7$ | −8.191E−04 | −5.365E−03 | | |
| $A_8$ | −1.922E−03 | −1.416E−03 | | |
| $A_9$ | −3.331E−04 | 9.586E−04 | | |
| $A_{10}$ | 2.555E−04 | −1.437E−04 | | |

FIG. 14

| EXAMPLE 4: LENS DATA ||||| 
|---|---|---|---|---|
| Si (SURFACE NUMBER) | Ri (RADIUS OF CURVATURE) | Di (SPACING) | Ndj (REFRACTIVE INDEX) | vdj (ABBE NUMBER) |
| 0 (APERTURE DIAPHRAGM) | 0.000 | 0.00 | | |
| *1 | 2.936 | 0.80 | 1.532 | 55.4 |
| *2 | −9.085 | 1.03 | | |
| *3 | −1.166 | 0.59 | 1.604 | 27.2 |
| *4 | −2.258 | 0.10 | | |
| *5 | 1.182 | 0.90 | 1.532 | 55.4 |
| *6 | 1.668 | 0.70 | | |
| 7 | 0.000 | 0.30 | 1.516 | 64.1 |
| 8 | 0.000 | 1.02 | | |

(*ASPHERIC SURFACE)   (f=4.12, FNO=2.8, bf=1.92, TL=5.34, Ih=2.8)

FIG. 15

| EXAMPLE 4: ASPHERIC DATA | | | | |
|---|---|---|---|---|
| ASPHERIC COEFFICIENT | SURFACE NUMBER | | | |
| | FIRST SURFACE | SECOND SURFACE | THIRD SURFACE | FOURTH SURFACE |
| K | 1.052E+00 | −1.073E+02 | −7.283E+00 | 5.310E−02 |
| $A_3$ | 7.653E−04 | 6.776E−03 | −3.706E−02 | −6.904E−02 |
| $A_4$ | −1.945E−02 | −6.611E−02 | −1.410E−01 | −3.641E−02 |
| $A_5$ | −2.478E−02 | −4.154E−03 | 4.805E−02 | 4.277E−02 |
| $A_6$ | 1.163E−02 | 1.551E−02 | 9.157E−02 | 4.611E−02 |
| $A_7$ | 1.739E−02 | 1.948E−02 | 4.781E−02 | 1.101E−02 |
| $A_8$ | −8.495E−03 | 5.358E−04 | −2.091E−02 | −2.168E−03 |
| $A_9$ | −2.104E−02 | −6.429E−02 | −5.454E−02 | −2.544E−03 |
| $A_{10}$ | 1.342E−03 | 3.127E−02 | 2.034E−02 | −2.905E−03 |
| | FIFTH SURFACE | SIXTH SURFACE | | |
| K | −4.955E+00 | −5.667E+00 | | |
| $A_3$ | −2.607E−02 | 5.936E−02 | | |
| $A_4$ | −3.642E−02 | −1.071E−01 | | |
| $A_5$ | 1.103E−02 | 2.942E−02 | | |
| $A_6$ | 8.026E−03 | 7.425E−03 | | |
| $A_7$ | −7.984E−04 | −3.913E−03 | | |
| $A_8$ | −1.248E−03 | −7.525E−04 | | |
| $A_9$ | −1.909E−04 | 6.106E−04 | | |
| $A_{10}$ | 1.462E−04 | −1.132E−04 | | |

FIG. 16

| EXAMPLE 5: LENS DATA ||||||
|---|---|---|---|---|
| Si (SURFACE NUMBER) | Ri (RADIUS OF CURVATURE) | Di (SPACING) | Ndj (REFRACTIVE INDEX) | vdj (ABBE NUMBER) |
| 0 (APERTURE DIAPHRAGM) | 0.000 | −0.12 | | |
| *1 | 2.082 | 1.08 | 1.509 | 56 |
| *2 | −22.809 | 0.76 | | |
| *3 | −1.245 | 0.69 | 1.604 | 27.2 |
| *4 | −2.205 | 0.14 | | |
| *5 | 1.732 | 1.07 | 1.509 | 56 |
| *6 | 2.146 | 0.70 | | |
| 7 | 0.000 | 0.30 | 1.516 | 64.1 |
| 8 | 0.000 | 0.87 | | |

(*ASPHERIC SURFACE)        (f=4.45, FNO=3.0, bf=1.77, TL=5.51, Ih=2.8)

FIG. 17

| EXAMPLE 5: ASPHERIC DATA | | | | |
|---|---|---|---|---|
| ASPHERIC COEFFICIENT | SURFACE NUMBER | | | |
| | FIRST SURFACE | SECOND SURFACE | THIRD SURFACE | FOURTH SURFACE |
| K | 9.379E−01 | 2.478E+02 | −6.217E+00 | −2.246E−01 |
| $A_3$ | 1.062E−03 | −1.104E−02 | −5.145E−02 | −3.393E−02 |
| $A_4$ | −5.791E−03 | 1.374E−02 | −1.658E−01 | −5.521E−02 |
| $A_5$ | −1.562E−02 | −4.721E−02 | 3.795E−02 | 3.854E−02 |
| $A_6$ | 1.095E−02 | −1.602E−02 | 9.907E−02 | 5.202E−02 |
| $A_7$ | 7.624E−03 | 3.836E−02 | 5.664E−02 | 9.144E−03 |
| $A_8$ | −1.100E−02 | 3.324E−02 | −2.349E−02 | −6.410E−03 |
| $A_9$ | −6.171E−03 | −8.390E−02 | −6.647E−02 | −2.998E−03 |
| $A_{10}$ | 5.517E−04 | 2.728E−02 | 1.310E−02 | −1.098E−03 |
| | FIFTH SURFACE | SIXTH SURFACE | | |
| K | −8.307E+00 | −1.118E−01 | | |
| $A_3$ | −1.699E−02 | 1.096E−02 | | |
| $A_4$ | −5.036E−02 | −1.249E−01 | | |
| $A_5$ | 1.292E−02 | 3.310E−02 | | |
| $A_6$ | 1.076E−02 | 1.267E−02 | | |
| $A_7$ | −7.790E−04 | −5.890E−03 | | |
| $A_8$ | −1.888E−03 | −1.431E−03 | | |
| $A_9$ | −2.528E−04 | 1.079E−03 | | |
| $A_{10}$ | 2.462E−04 | −1.808E−04 | | |

FIG. 18

| EXAMPLE 6: LENS DATA | | | | |
|---|---|---|---|---|
| Si (SURFACE NUMBER) | Ri (RADIUS OF CURVATURE) | Di (SPACING) | Ndj (REFRACTIVE INDEX) | νdj (ABBE NUMBER) |
| 0 (APERTURE DIAPHRAGM) | 0.000 | 0.00 | | |
| *1 | 2.786 | 0.93 | 1.569 | 58.6 |
| *2 | −107.516 | 0.98 | | |
| *3 | −1.014 | 0.69 | 1.604 | 27.2 |
| *4 | −1.866 | 0.11 | | |
| *5 | 1.733 | 1.01 | 1.532 | 55.4 |
| *6 | 3.864 | 0.70 | | |
| 7 | 0.000 | 0.30 | 1.516 | 64.1 |
| 8 | 0.000 | 1.85 | | |

(*ASPHERIC SURFACE)    (f=4.87, FNO=2.8, bf=2.75, TL=6.47, Ih=2.8)

FIG. 19

| ASPHERIC COEFFICIENT | SURFACE NUMBER | | | |
|---|---|---|---|---|
| | FIRST SURFACE | SECOND SURFACE | THIRD SURFACE | FOURTH SURFACE |
| EXAMPLE 6: ASPHERIC DATA | | | | |
| K | 1.529E+00 | −2.098E+01 | −2.544E+00 | −2.182E−01 |
| A3 | −1.171E−03 | −6.318E−03 | −4.706E−03 | 9.304E−04 |
| A4 | 1.098E−03 | 6.412E−03 | −1.197E−01 | −4.870E−02 |
| A5 | −2.694E−02 | −2.994E−02 | 2.350E−02 | 2.317E−02 |
| A6 | 1.576E−02 | −1.013E−02 | 5.743E−02 | 3.161E−02 |
| A7 | 1.627E−02 | 2.500E−02 | 3.325E−02 | 4.491E−03 |
| A8 | −1.327E−02 | 2.133E−02 | −7.001E−03 | −3.384E−03 |
| A9 | −1.683E−02 | −4.286E−02 | −3.047E−02 | −1.139E−03 |
| A10 | 1.087E−02 | 1.271E−02 | 7.698E−03 | −4.223E−04 |
| | FIFTH SURFACE | SIXTH SURFACE | | |
| K | −7.464E+00 | −9.633E−01 | | |
| A3 | 2.885E−02 | 4.157E−02 | | |
| A4 | −4.082E−02 | −9.714E−02 | | |
| A5 | 4.993E−03 | 2.450E−02 | | |
| A6 | 6.245E−03 | 8.043E−03 | | |
| A7 | −6.033E−04 | −3.673E−03 | | |
| A8 | −8.382E−04 | −8.241E−04 | | |
| A9 | −2.324E−05 | 5.802E−04 | | |
| A10 | 6.286E−05 | −8.585E−05 | | |

FIG. 20

| Si (SURFACE NUMBER) | Ri (RADIUS OF CURVATURE) | Di (SPACING) | Ndj (REFRACTIVE INDEX) | vdj (ABBE NUMBER) |
|---|---|---|---|---|
| EXAMPLE 7: LENS DATA ||||||
| 0 (APERTURE DIAPHRAGM) | 0.000 | −0.15 | | |
| *1 | 2.038 | 0.84 | 1.532 | 55.4 |
| *2 | 73108.350 | 0.93 | | |
| *3 | −1.161 | 0.60 | 1.604 | 27.2 |
| *4 | −2.648 | 0.40 | | |
| *5 | 1.575 | 1.19 | 1.532 | 55.4 |
| *6 | 2.758 | 0.70 | | |
| 7 | 0.000 | 0.30 | 1.516 | 64.1 |
| 8 | 0.000 | 0.84 | | |

(*ASPHERIC SURFACE)  (f=4.61, FNO=2.8, bf=1.74, TL=5.70, Ih=2.83)

FIG. 21

| EXAMPLE 7: ASPHERIC DATA | | | | |
|---|---|---|---|---|
| ASPHERIC COEFFICIENT | SURFACE NUMBER | | | |
| | FIRST SURFACE | SECOND SURFACE | THIRD SURFACE | FOURTH SURFACE |
| K | 9.998E−01 | −9.900E+01 | −3.594E+00 | 1.555E+00 |
| $A_3$ | −2.408E−03 | 2.221E−04 | −5.143E−02 | −7.380E−02 |
| $A_4$ | 1.019E−03 | −5.316E−02 | −2.373E−01 | −8.741E−02 |
| $A_5$ | −2.266E−02 | 5.243E−02 | −2.988E−02 | 6.309E−02 |
| $A_6$ | 9.156E−03 | −7.184E−02 | 1.808E−01 | 4.619E−02 |
| $A_7$ | −5.620E−03 | −2.099E−02 | 8.661E−02 | 4.888E−03 |
| $A_8$ | −2.773E−03 | 5.773E−02 | −5.765E−02 | −2.440E−03 |
| $A_9$ | 1.587E−02 | −1.823E−02 | −8.730E−02 | 9.650E−04 |
| $A_{10}$ | −2.349E−02 | −1.699E−02 | 3.683E−02 | −1.821E−03 |
| | FIFTH SURFACE | SIXTH SURFACE | | |
| K | −4.923E+00 | 5.832E−01 | | |
| $A_3$ | −3.248E−02 | 2.663E−02 | | |
| $A_4$ | −3.955E−02 | −1.181E−01 | | |
| $A_5$ | 1.664E−02 | 2.593E−02 | | |
| $A_6$ | 9.412E−03 | 1.381E−02 | | |
| $A_7$ | −1.982E−03 | −5.083E−03 | | |
| $A_8$ | −1.925E−03 | −1.589E−03 | | |
| $A_9$ | −9.141E−05 | 8.693E−04 | | |
| $A_{10}$ | 2.152E−04 | −1.175E−04 | | |

FIG. 22

| | CONDITIONAL EXPRESSION (1) | CONDITIONAL EXPRESSION (2) | CONDITIONAL EXPRESSION (3) | CONDITIONAL EXPRESSION (4) | CONDITIONAL EXPRESSION (5) | CONDITIONAL EXPRESSION (6) | CONDITIONAL EXPRESSION (7) |
|---|---|---|---|---|---|---|---|
| EXAMPLE 1 | 0.81 | 0.95 | 1.15 | 1.70 | 0.29 | 1.07 | 30.8 |
| EXAMPLE 2 | 0.97 | 0.90 | 1.84 | 1.88 | 0.36 | 0.89 | 28.2 |
| EXAMPLE 3 | 0.78 | 0.96 | 0.99 | 1.44 | 0.29 | 1.09 | 30.8 |
| EXAMPLE 4 | 1.04 | 0.51 | 1.22 | 1.13 | 0.36 | 0.95 | 28.2 |
| EXAMPLE 5 | 0.85 | 0.83 | 1.46 | 2.12 | 0.32 | 0.98 | 28.8 |
| EXAMPLE 6 | 0.98 | 0.95 | 1.09 | 1.04 | 0.43 | 1.16 | 31.4 |
| EXAMPLE 7 | 0.83 | 1.00 | 0.88 | 1.11 | 0.30 | 1.01 | 28.2 |

IMAGING LENS

BACKGROUND OF THE INVENTION

1. Field of the Invention

This invention relates to a fixed-focus imaging lens suited to installation in a small-sized imaging apparatus such as a digital camera using an imaging device of a CCD (Charge Coupled Device), a CMOS (Complementary Metal Oxide Semiconductor), etc., or a cameral using a silver film.

2. Description of Related Art

In recent years, a digital still camera (hereinafter simply referred to as "digital camera") for enabling image information of a photographed landscape, portrait, etc., to be input to a personal computer has sprung into wide use with the widespread proliferation of a personal computer into ordinary households, etc. A module camera for image input (mobile module camera) has often been installed in a mobile telephone with higher functionality of a mobile telephone.

In the imaging apparatus, an imaging device of a CCD, a CMOS, etc., is used. Such an imaging apparatus has been very miniaturized as the entire apparatus because of recent advance in miniaturization of the imaging device. Providing the imaging device with a larger number of pixels has also advanced and higher resolution and higher performance have been intended.

For example, imaging lenses described in the following documents are available as those used with such a miniaturized imaging apparatus. JP-A-2002-221659, JP-A-2004-302058, JP-A-2005-173319, JP-A-2005-227755 and JP-A-2005-292235 describe imaging lenses each made up of three lenses.

As described above, the recent imaging device has advanced in miniaturization and a larger number of pixels and accordingly high resolution performance and a compacted configuration are demanded particularly for the imaging lens for a digital camera. On the other hand, formerly the cost performance and compactibility were mainly demanded for the imaging lens of a mobile module camera, but recently providing the imaging device with a larger number of pixels has also tended to advance in the mobile module camera and requirement for the performance has also become high.

Thus, development of a wide variety of lenses totally improved in the cost, image formation performance, and compactibility is demanded; for example, development of a low-cost and high-performance imaging lens intended for installation in a digital camera in the performance aspect while ensuring compactibility for enabling installation of the imaging lens in a mobile module camera is demanded.

For such requirements, for example, it is possible to adopt three lenses as the number of lenses (three-lens configuration) for compaction and cost reduction and aggressively use an aspheric surface for higher performance. However, adopting an aspheric surface is disadvantageous for manufacturability and easily results in an increase in the cost although it contributes to compaction and higher performance. Thus, to use the aspheric surface, manufacturability needs to be considered sufficiently. Generally, a four-lens configuration would easily result in upsizing and an increase in the cost although it is advantageous for performance improvement as compared with the three-lens configuration. The lenses described in the documents above adopt a three-lens configuration and use an aspheric surface, but are insufficient from the viewpoint of compatibility between the image formation performance and compactibility.

SUMMARY OF THE INVENTION

An object of an illustrative, non-limiting embodiment of the present invention is to provide an imaging lens for providing high image formation performance while the imaging lens has a more compact configuration.

According to an aspect of the invention, there is provided an imaging lens including: a first lens having a convex surface directed to an object side on an optical axis and having a positive power; an aperture diaphragm placed between a top position of an object-side surface of the first lens and a position of an image-side surface of the first lens on an optical axis; a second lens on an image side of the first lens, the second lens having a meniscus shape with a concave surface directed to the object side on the optical axis; and a third lens on the image side of the second lens, the third lens having a meniscus shape with a convex surface directed to the object side on the optical axis, the imaging lens satisfying the following conditional expressions (1) to (3), wherein the entire focal length of the imaging lens is f, the focal length of the first lens is f1, the focal length of the second lens is f2, the radius of curvature of the object-side surface of the first lens is R1, and the radius of curvature of the image-side surface of the first lens is R2.

$$0.5 < f1/f < 2.0 \quad (1)$$

$$0.5 < (|R2|-R1)/(R1+|R2|) \leq 1.0 \quad (2)$$

$$0.5 < |f2|/f < 3.0 \quad (3)$$

An imaging lens according to an aspect of the invention is compacted as it is made up of a small number of lenses (three), and provides high image formation performance compatible with a digital camera installing an imaging device with a large number of pixels. Specifically, since the first lens has such power satisfying conditional expression (1), upsizing is suppressed and an increase in spherical aberration is also suppressed. The object-side surface of the first lens has such a shape satisfying conditional expression (2), whereby field curvature is well corrected. Since the second lens has such power satisfying conditional expression (3), high-order aberration of spherical aberration, coma aberration, etc., is well corrected. The aperture diaphragm is placed between the top position of the object-side surface of the first lens and the position of the image-side surface of the first lens on the optical axis, so that compatibility between ensuring of telecentric property and lessening of the effect of mutual axis shift in the first lens to the third lens on the optical performance (axis shift sensitivity) can be provided and in addition, there is also an advantage for shortening the full length of the imaging lens.

The imaging lens may further satisfy the following conditional expression (4), wherein the focal length of the third lens is f3. Accordingly, the power of the third lens can be made appropriate, and compatibility between ensuring of sufficient back focus and aberration correction can be accomplished.

$$0.9 < f3/f < 3.0 \quad (4)$$

The imaging lens may further satisfy the following conditional expression (5), wherein the distance from the image-side surface of the third lens to the image formation surface (in terms of air) is represented as bf and the distance from the object-side surface of the first lens to the image formation surface (in terms of air) is represented as TL. In so doing, more sufficient back focus can be ensured.

$$bf/TL > 0.2 \quad (5)$$

The imaging lens may further satisfy the following conditional expression (6), wherein the maximum image height on the image formation surface is Ih. Accordingly, further miniaturization can be accomplished.

$$TL/(2 \times Ih) < 1.2 \qquad (6)$$

In the imaging lens, the second lens may have a negative power and the imaging lens may satisfy the following conditional expression (7), wherein the Abbe number of the first lens is v1 and the Abbe number of the second lens is v2. As conditional expression (7) is satisfied, lateral color can be better corrected.

$$v1 - v2 > 20 \qquad (7)$$

In the imaging lens, the aperture diaphragm may be placed between the top position of the object-side surface of the first lens and an edge position of the object-side surface of the first lens on the optical axis. In so doing, the angle of the emission light ray toward the image formation surface can lessen, so that the telecentric property is ensured easily. It is advantageous for shortening the full length as compared with the case where the aperture diaphragm is placed to the object side than the top position of the object-side surface of the first lens on the optical axis.

In the imaging lens, each of the first, second, and third lenses may contain at least one aspheric surface. In so doing, high aberration performance can be provided comparatively easily. If the first lens is formed of optical glass and the second lens and the third lens are formed of a resin material, slimming down as well as a decrease in the aberrations and distortion (particularly lateral color) can be realized.

BRIEF DESCRIPTION OF THE DRAWINGS

The features of the invention will appear more fully upon consideration of the exemplary embodiment of the invention, which are schematically set forth in the drawings, in which:

FIG. 8 shows lens data in the imaging lens in example 1;

FIG. 9 shows data concerning aspheric surfaces in the imaging lens in example 1;

FIG. 10 shows lens data in the imaging lens in example 2;

FIG. 11 shows data concerning aspheric surfaces in the imaging lens in example 2;

FIG. 12 shows lens data in the imaging lens in example 3;

FIG. 13 shows data concerning aspheric surfaces in the imaging lens in example 3;

FIG. 14 shows lens data in the imaging lens in example 4;

FIG. 15 shows data concerning aspheric surfaces in the imaging lens in example 4;

FIG. 16 shows lens data in the imaging lens in example 5;

FIG. 17 shows data concerning aspheric surfaces in the imaging lens in example 5;

FIG. 18 shows lens data in the imaging lens in example 6;

FIG. 19 shows data concerning aspheric surfaces in the imaging lens in example 6;

FIG. 20 shows lens data in the imaging lens in example 7;

FIG. 21 shows data concerning aspheric surfaces in the imaging lens in example 7;

FIG. 22 shows the numeric values corresponding to conditional expressions (1) to (7) in the imaging lenses in examples 1 to 7;

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment, a positive first lens having a convex surface directed to the object side on the optical axis, a second lens having a meniscus shape with a concave surface directed to the object side on the optical axis, and the third lens having a meniscus shape with a convex surface directed to the object side on the optical axis are placed in order from the object side, an aperture diaphragm is placed between a position of the object-side surface of the first lens and a position of the image-side surface of the first lens on the optical axis, and conditional expressions (1) to (3) are all satisfied, so that while the aberrations of spherical aberration, field curvature, coma aberration, etc., are well corrected and high image formation performance is provided, compaction can be realized.

An exemplary embodiment of the invention will be discussed in detail with reference to the accompanying drawings.

Figure 1:
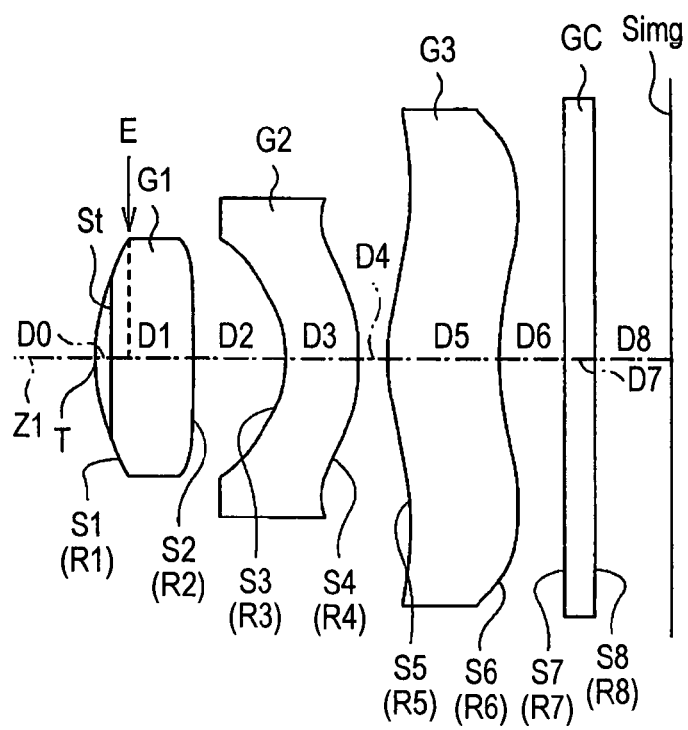
FIG. 1 shows a first example of an imaging lens as one exemplary embodiment of the invention and is a sectional view corresponding to example 1.

FIG. 1 shows a first example of an imaging lens as one exemplary embodiment of the invention. This example corresponds to the lens configuration in example 1 described later with reference to FIGS. 8 and 9. FIGS. 2 to 7 show second to seventh examples respectively in the embodiment. The second example corresponds to the lens configuration in example 2 described later with reference to FIGS. 10 and 11; the third example corresponds to the lens configuration in example 3 described later with reference to FIGS. 12 and 13; the fourth example corresponds to the lens configuration in example 4 described later with reference to FIGS. 14 and 15; the fifth example corresponds to the lens configuration in example 5 described later with reference to FIGS. 16 and 17;

the sixth example corresponds to the lens configuration in example 6 described later with reference to FIGS. 18 and 19; and the seventh example corresponds to the lens configuration in example 7 described later with reference to FIGS. 20 and 21. In FIGS. 1 to 7, symbol Si denotes the ith surface when the surface of the component nearest to an object is the first and symbols are given so as to increase in order toward the image side (imaging side). Symbol Ri denotes the radius of curvature of the surface Si. Symbol Di denotes the surface distance on an optical axis Z1 between the ith surface Si and the (i+1)st surface Si+1. The examples are the same in basic configuration and therefore the description to follow is based on the configuration example of the imaging lens shown in FIG. 1 and the examples in FIGS. 2 to 7 are also described as required.

The imaging lens is installed in a mobile module camera, a digital camera, etc., using an imaging device of a CCD, a CMOS, etc., for example, for use. The imaging lens includes a first lens G1, a second lens G2, and a third lens G3 disposed in order from the object side along the optical axis Z1. Further, an aperture diaphragm St is placed between the surface position on the object side of the first lens G1 on the optical axis (cross position of the surface S1 and the optical axis Z1) and the surface position on the image side of the first lens G1 on the optical axis (cross position of the surface S2 and the optical axis Z1). An imaging device of a CCD, etc., (not shown) is placed on an image formation surface (imaging surface) Simg of the imaging lens. For example, optical members GC of an infrared cut filter, a low-pass filter, etc., as well as cover glass for protecting the image formation surface are placed between the third lens G3 and the image formation surface (image formation surface) Simg.

The first lens G1 forms a meniscus shape with a convex surface directed to the object side in the proximity of the optical axis Z1 (examples 1, 2, and 7) or a convex shape on both sides (examples 3 to 6) and has a positive power. For the first lens G1, preferably, for example, at least one of the surface S1 on the object side and the surface S2 on the image side is an aspheric surface; particularly, preferably both surfaces S1 and S2 are an aspheric surface. Further, preferably the first lens G1 is formed of optical glass with comparatively small dispersion because high aberration performance is easily provided and performance change accompanying temperature change is also small. However, the first lens G1 may be formed of a resin material. In so doing, it is advantageous in points of low cost and weight reduction. The aperture diaphragm St is placed between the surfaces S1 and S2 on the optical axis Z1 (also containing position of the surface S1 and position of the surface S2 on the optical axis Z1).

The second lens G2 forms a meniscus shape with a concave surface directed to the object side in the proximity of the optical axis Z1 and has a negative power. For the second lens G2, preferably, for example, at least one of the surface S3 on the object side and the surface S4 on the image side is an aspheric surface; particularly, preferably both surfaces S3 and S4 are an aspheric surface.

The third lens G3 forms a meniscus shape with a convex surface directed to the object side in the proximity of the optical axis Z1 and has positive power. For the third lens G3, preferably, for example, at least one of the surface S5 on the object side and the surface S6 on the image side is an aspheric surface. Particularly, preferably the surface S5 is shaped as an aspheric surface with the positive power weakening as the periphery is approached in the range of the effective diameter, and the surface S6 is shaped as an aspheric surface with the negative power weakening as the periphery is approached in the range of the effective diameter. That is, preferably the surface S5 on the object side is an aspheric surface with a concave shape in the periphery although it is a convex shape in the proximity of the optical axis Z1, and the surface S6 on the image side is an aspheric surface with a convex shape in the periphery although it is a concave shape in the proximity of the optical axis Z1.

It is advisable to form the second lens G2 and the third lens G3 each having a complicated shape and a larger size as compared with the first lens G1, of a resin material. In so doing, the complicated aspheric shape becomes easy to form with high accuracy and the whole imaging lens can be furthermore slimmed down.

Further, the imaging lens satisfies all of the following conditional expressions (1) to (3), wherein f is the entire focal length, f1 is the focal length of the first lens G1, f2 is the focal length of the second lens G2, R1 is the radius of curvature of the surface S1 on the object side of the first lens G1, and R2 is the radius of curvature of the surface S2 on the image side of the first lens G1:

$$0.5 < f1/f < 2.0 \quad (1)$$

$$0.5 < (|R2-R1|)/(|R1|+|R2|) \leq 1.0 \quad (2)$$

$$0.5 < |f2|/f < 3.0 \quad (3)$$

It is advisable for the imaging lens to further satisfy the following conditional expression (4), wherein f3 is the focal length of the third lens G3:

$$0.9 < f3/f < 3.0 \quad (4)$$

It is advisable for the imaging lens to further satisfy the following conditional expression (5), wherein bf is the distance from the surface S6 of the third lens G3 to the image formation surface Simg (in terms of air) and TL is the distance from the surface S1 of the first lens G1 to the image formation surface Simg (in terms of air):

$$bf/TL > 0.2 \quad (5)$$

It is advisable for the imaging lens to further satisfy the following conditional expression (6), wherein Ih is the maximum image height on the image formation surface Simg:

$$TL/(2 \times Ih) < 1.2 \quad (6)$$

It is advisable for the imaging lens to further satisfy the following conditional expression (7), wherein v1 is the Abbe number of the first lens G1 and v2 is the Abbe number of the second lens G2:

$$v1 - v2 > 20 \quad (7)$$

Next, the functions and the advantages of the imaging lens of the embodiment described above will be discussed.

The imaging lens of the embodiment is compacted by adopting the small number of lenses, three and provides high image formation performance compatible with a digital camera installing an imaging device with a large number of pixels. Specifically, since the first lens has such power satisfying conditional expression (1), upsizing is suppressed and an increase in spherical aberration is also suppressed. The surface on the object side of the first lens has such a shape satisfying conditional expression (2), whereby field curvature is well corrected. Since the second lens has such power satisfying conditional expression (3), high-order aberration of spherical aberration, coma aberration, etc., is well corrected. Further, the aperture diaphragm St is placed between the surfaces S1 and S2 on the optical axis Z1, so that compatibility between ensuring of telecentric property and lessening of the effect of axis shift in the first lens G1 to the third lens G3 on the optical performance (axis shift sensitivity) is provided and in addition, shortening of the full length is also accomplished.

To lessen the angle of the emission light ray toward the image formation surface (incidence angle on the imaging device), it is advantageous to place the aperture diaphragm St at a position to the object side as much as possible. However, if the aperture diaphragm St is positioned to the object side rather than the surface S1, the distance between the aperture diaphragm St and the surface S1 is added as the optical path length and thus it becomes disadvantageous for miniaturization (height reduction) of the entire configuration. On the other hand, relative position shift between the object-side surface and the image-side surface in each of the first lens G1 to the third lens G3 and mutual position shift among the first lens G1 to the third lens G3 (hereinafter, the former and latter position shifts will be collectively referred simply as "axis shift") incur degradation of the image formation performance in response to the degree of the axis shift. To decrease the effect of such axis shift on the image formation performance, it is advisable to place the aperture diaphragm St to the image side as much as possible. For this reason, the aperture diaphragm St is positioned between the surfaces S1 and S2 on the optical axis Z1. Particularly, if the aperture diaphragm St is placed between a top position T of the surface S1 and an edge position E of the surface S1 (see FIG. 1), the angle of the emission light ray toward the image formation surface Simg more lessens, so that the telecentric property is ensured more easily. The top position T refers to the intersection point of the surface S1 and the optical axis Z1, and the edge position E refers to the intersection point of the normal to the optical axis Z1 from the edge of the surface S1 and the optical axis Z1. The fact that the surface S1 is convex generally is disadvantageous for ensuring the telecentric property. However, in the embodiment, the telecentric property sufficient for compensating for the disadvantage that the surface S1 is convex is ensured by placing the aperture diaphragm St at the above-mentioned position. It can also be said that the fact that the surface S1 is convex provides a structure for allowing the aperture diaphragm St to be easily placed between the top of the surface S1 and the edge of the surface S1.

Further, in the imaging lens of the embodiment, if the surfaces S1 to S6 of the first lens G1 to the third lens G3 are formed each like an aspheric surface defined by even-numbered-order and odd-numbered-order aspheric coefficients, compatibility between compaction and improvement in the image formation performance is provided furthermore easily.

Further, if conditional expression (4) is satisfied, compatibility between ensuring of back focus and aberration correction is provided. If conditional expressions (5) and (6) are satisfied, further miniaturization is realized while sufficient back focus is ensured.

Conditional expression (7) defines the balance between the Abbe numbers of the first lens G1 and the second lens G2 and as the conditional expression is satisfied, lateral color can be better corrected.

The meanings of expressions (1) to (6) will be discussed below in detail:

Conditional expression (1) is an expression representing the appropriate range of the amount (f1/f) representing the magnitude of the power of the first lens G1 (1/f1) relative to the power of the entire system (1/f). The power distribution of the first lens G1 is made appropriate, whereby correction of aberrations and ensuring of sufficient back focus can be executed in a well-balanced manner. If the positive power of the first lens G1 becomes too strong falling below the lower limit of conditional expression (1), particularly correction of spherical aberration becomes insufficient and in addition, upsizing of the entire system is incurred. On the other hand, if the positive power of the first lens G1 becomes too weak exceeding the upper limit of conditional expression (1), it becomes impossible to ensure sufficient back focus. Particularly, in the imaging lens, if the following conditional expression (8) is satisfied, better aberration correction is made possible:

$$0.7 < f1/f < 1.5 \quad (8)$$

Conditional expression (2) relates to the shape of the first lens G1 and if the value is placed beyond the numeric range, mainly it becomes difficult to correct field curvature.

Conditional expression (3) is an expression representing the appropriate range of the amount (f2/f) representing the magnitude of the power of the second lens G2 (1/f2) relative to the power of the whole system (1/f). The power distribution of the second lens G2 is made appropriate, whereby aberrations can be well corrected. If the negative power of the second lens G2 becomes too strong falling below the lower limit of conditional expression (3), an increase in high-order aberration is incurred. On the other hand, if the negative power of the second lens G2 becomes too weak exceeding the upper limit of conditional expression (3), mainly it becomes difficult to correct spherical aberration and coma aberration. Particularly, in the imaging lens, if the following conditional expression (9) is satisfied, better aberration correction is made possible:

$$0.8 < |f2/f| < 2.0 \quad (9)$$

Conditional expression (4) is an expression representing the appropriate range of the amount (f3/f) representing the magnitude of the power of the third lens G3 (1/f3) relative to the power of the whole system (1/f). The power distribution of the third lens G3 is made appropriate, whereby correction of aberrations and ensuring of sufficient back focus can be executed in a well-balanced manner. If the positive power of the third lens G3 becomes too strong falling below the lower limit of conditional expression (4), it becomes impossible to ensure sufficient back focus. On the other hand, if the positive power of the third lens G3 becomes too weak exceeding the upper limit of conditional expression (4), sufficient aberration correction becomes difficult to make. Particularly, if the following conditional expression (10) is satisfied, ensuring of sufficient back focus and good aberration correction can be executed in a well-balanced manner:

$$1.0 < f3/f < 2.5 \quad (10)$$

Conditional expressions (5) and (6) define the compactibility of the whole imaging lens. As conditional expression (5) is satisfied, more sufficient back focus can be ensured. Particularly, if the following conditional expression (11) is satisfied, still larger back focus can be ensured. As conditional expression (6) is satisfied, further miniaturization can be realized.

$$bf/TL > 0.25 \quad (11)$$

Thus, according to the imaging lens of the embodiment, the first lens G1 to the third lens G3 are composed as described above and conditional expressions (1) to (3) are all satisfied, so that compaction is realized and high image formation performance can be provided. Particularly, if conditional expressions (4) to (11) are satisfied, further improvement in the image formation performance as well as further compaction can be realized.

Next, specific examples of the imaging lens according to the embodiment will be discussed.

Figure 2:
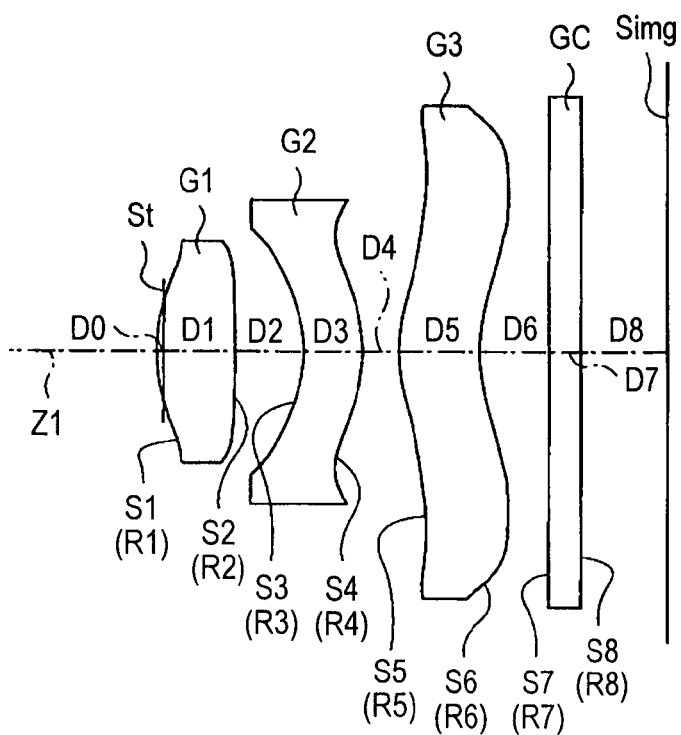
FIG. 2 shows a second example of an imaging lens as one exemplary embodiment of the invention and is a sectional view corresponding to example 2.
Figure 3:
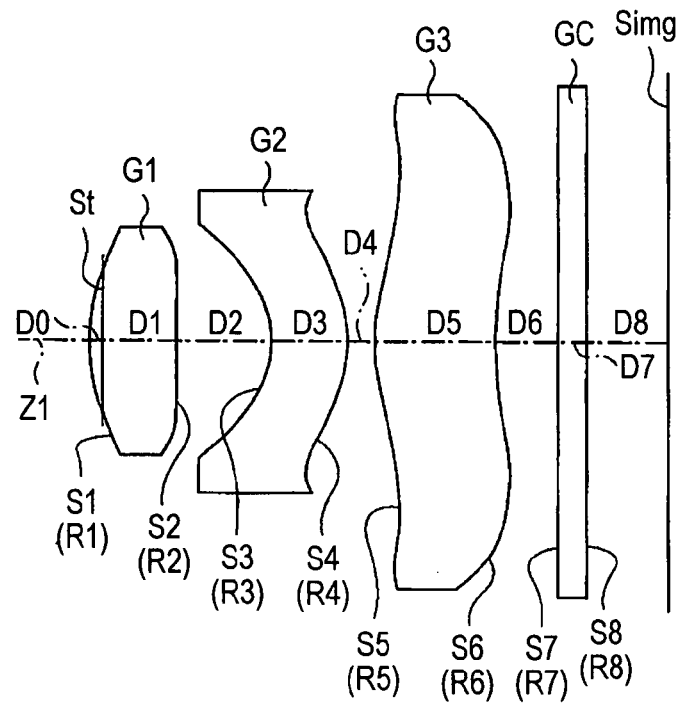
FIG. 3 shows a third example of an imaging lens as the embodiment of the invention and is a sectional view corresponding to example 3.
Figure 4:
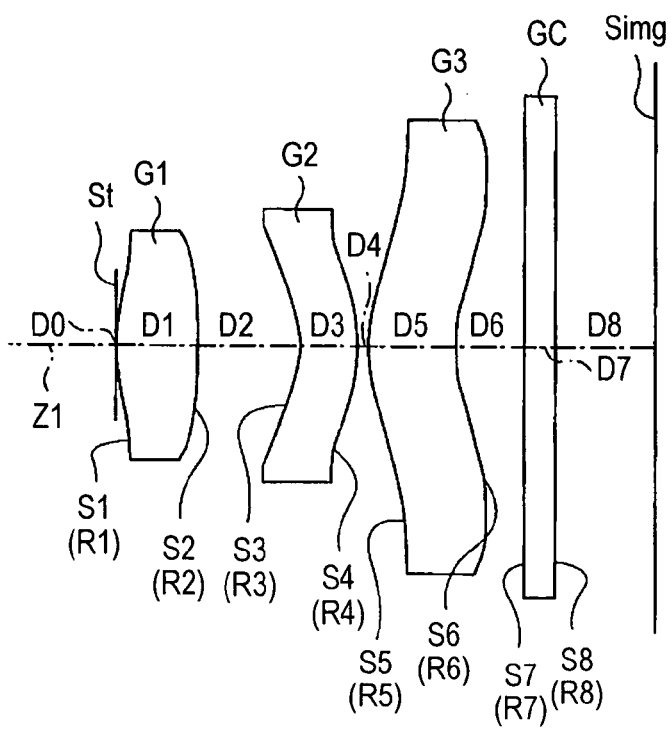
FIG. 4 shows a fourth example of an imaging lens as the embodiment of the invention and is a sectional view corresponding to example 4.
Figure 5:
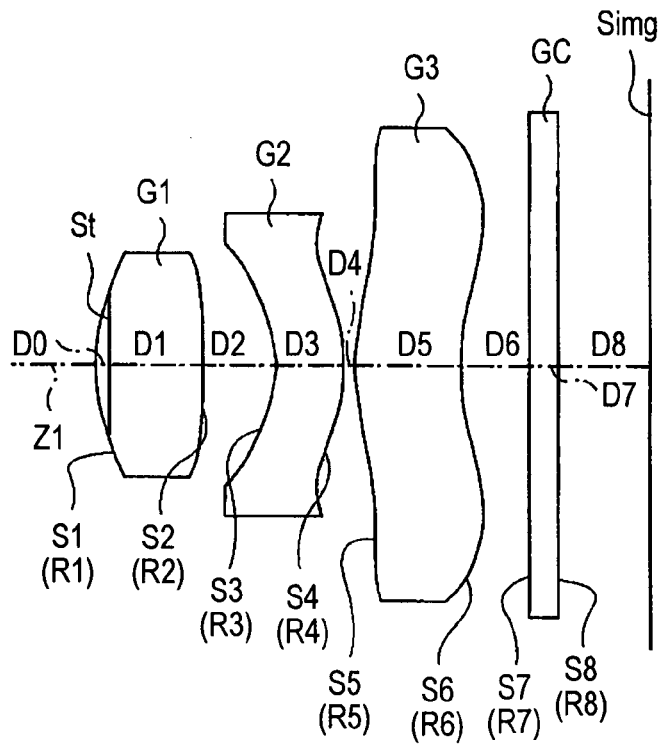
FIG. 5 shows a fifth example of an imaging lens as the embodiment of the invention and is a sectional view corresponding to example 5.
Figure 6:
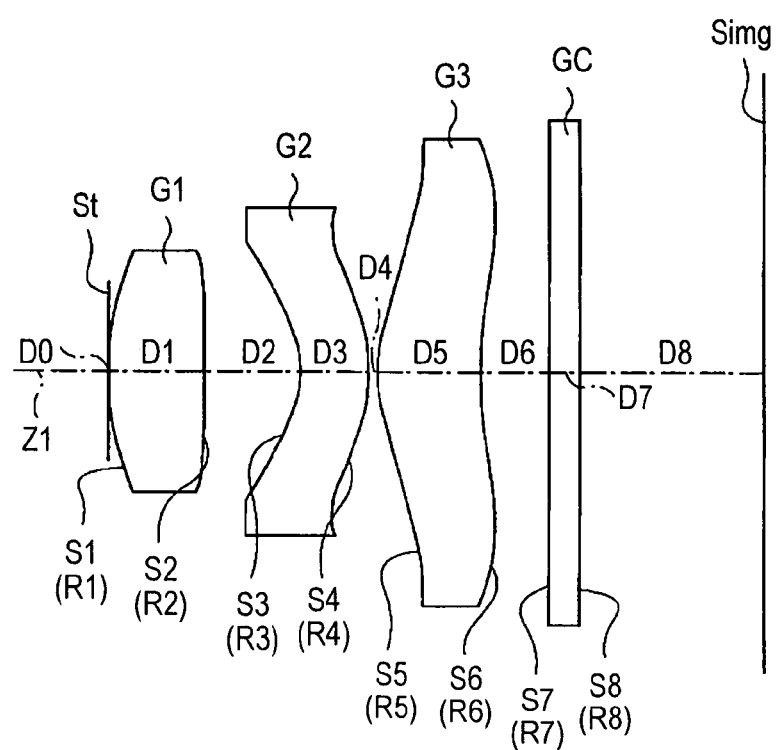
FIG. 6 shows a sixth example of an imaging lens as the embodiment of the invention and is a sectional view corresponding to example 6.
Figure 7:
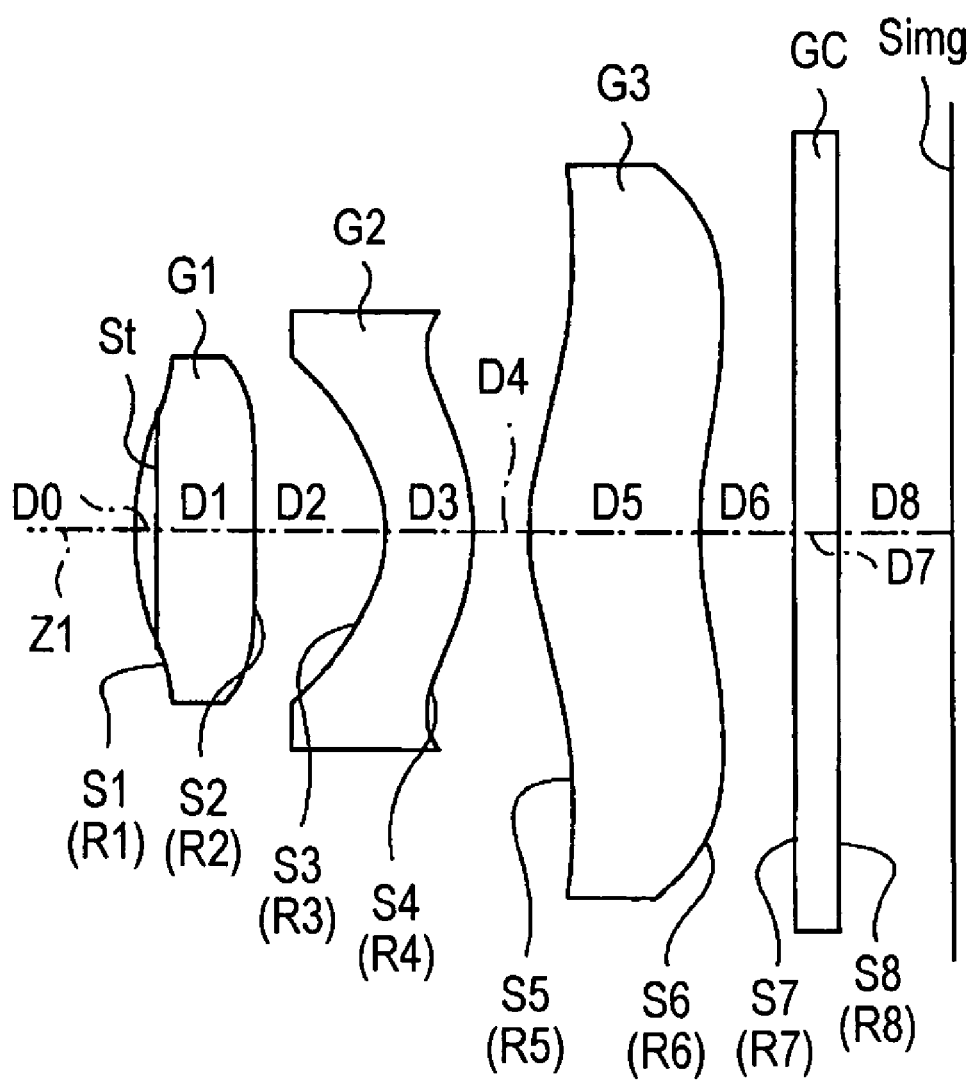
FIG. 7 shows a seventh example of an imaging lens as the embodiment of the invention and is a sectional view corresponding to example 7.

Examples 1 to 7 will be discussed together. FIGS. 8 and 9 show specific lens data (example 1) corresponding to the first configuration example of the imaging lens shown in FIG. 1. Likewise, FIGS. 10 and 11 show specific lens data (example 2) corresponding to the second configuration example (FIG. 2); FIGS. 12 and 13 show specific lens data (example 3) corresponding to the third configuration example (FIG. 3); FIGS. 14 and 15 show specific lens data (example 4) corresponding to the fourth configuration example (FIG. 4); FIGS. 16 and 17 show specific lens data (example 5) corresponding to the fifth configuration example (FIG. 5); FIGS. 18 and 19 show specific lens data (example 6) corresponding to the sixth configuration example (FIG. 6); and FIGS. 20 and 21 show specific lens data (example 7) corresponding to the seventh configuration example (FIG. 7). FIGS. 8, 10, 12, 14, 16, 18, and 20 show the lens data of the examples, and FIGS. 9, 11, 13, 15, 17, 19, and 21 show the data concerning aspheric shapes, of the lens data of the examples.

The column of surface number Si in the lens data shown in each of FIGS. 8, 10, 12, 14, 16, 18, and 20 indicates the number of the ith (i=1 to 8) surface with the symbol given so as to increase in order toward the image side, wherein the surface of the component nearest to the object side except the aperture diaphragm St is the first corresponding to the symbol Si shown in FIGS. 1 to 7. The number "0" in the column of surface number Si indicates the aperture diaphragm. The column of radius of curvature Ri indicates the value of the radius of curvature of the ith surface from the object side corresponding to the symbol Ri shown in FIGS. 1 to 7. The column of spacing Di also indicates the spacing on the optical axis between the ith surface Si and the "i+1"st surface Si+1 from the object side corresponding to the symbol given in FIGS. 1 to 7. The values of the curvature radius Ri and the spacing Di are in millimeter (mm) units. The columns of Ndj and vdj indicate the values of the refractive index and the Abbe number of the jth (j=1 to 4) lens element from the object side at the d-line (587.6 nm) also containing the optical member GC. The values of the curvature radiuses R7 and R8 of both surfaces of the optical member GC are 0 (zero), meaning that the surfaces are flat. The column of the spacing Di of the aperture diaphragm (i.e., $D_0$) indicates the distance between the surface S1 and the aperture diaphragm St (i.e., $S_0$) on the optical axis (mm). Minus symbol means that the aperture diaphragm St exists to the image side than the surface S1. As general data, focal length of the entire system, f (mm), F number (FNO.), back focus bf (mm), the distance from the surface S1 on the object side of the first lens G1 to the image formation surface Simg (in terms of air), TL (mm), and the maximum image height in the image formation surface Simg, Ih (mm) are also shown in the margin of each of FIGS. 8, 10, 12, 14, 16, 18, and 20.

In FIGS. 8, 10, 12, 14, 16, 18, and 20, symbol "*" given to the left of the surface number Si indicates that the lens surface is an aspheric shape. In every example, both surfaces of all of the first lens G1 to the third lens G3 are aspheric. In the lens data, the numeric value of the radius of curvature in the proximity of the optical axis (i.e., on the optical axis) is shown as the radius of curvature of each of the aspheric surfaces.

In the numeric values of aspheric data in FIGS. 9, 11, 13, 15, 17, 19, and 21, symbol "E" indicates that the numeric value following the symbol "E" is "exponent" with 10 as the base and indicates that the numeric value represented by the exponential function with 10 as the base is multiplied by the numeric value preceding "E." For example, if "1.0E−02" is shown, it indicates "$1.0 \times 10^{-2}$."

In the aspheric data, the values of coefficients Ai and K in the expressions of aspheric shapes represented by the following expression (ASP) are shown. Z more particularly indicates the length (mm) of the normal to the tangential plane of the top of an aspheric surface (plane perpendicular to the optical axis) from a point on the aspheric surface at the position of height h from the optical axis.

$$Z = C \cdot h^2 / \{1 + (1 - K \cdot C^2 \cdot h^2)^{1/2}\} + A_3 \cdot h^3 + A_4 \cdot h^4 + A_5 \cdot h^5 + A_6 \cdot h^6 + A_7 \cdot h^7 + A_8 \cdot h^8 + A_9 \cdot h^9 + A_{10} \cdot h^{10} \quad (ASP)$$

where

Z: Depth of aspheric surface (mm)

h: Distance from optical axis to lens surface (height) (mm)

K: Eccentricity

C: Paraxial curvature=1/R (R: Paraxial curvature radius)

Ai: ith-order (i=3 to 10) aspheric coefficient

In every example, the aspheric shapes on both surfaces of all of the first lens G1 to the third lens G3 are those resulting from using not only even-numbered-order aspheric coefficients $A_4$, $A_6$, $A_8$, and $A_{10}$, but also odd-numbered-order aspheric coefficients $A_3$, $A_5$, $A_7$, and $A_9$ effectively as the aspheric coefficients.

FIG. 22 shows the values corresponding to conditional expressions (1) to (7) described above collectively for the examples. As shown in FIG. 22, the values in the examples are all within the numeric ranges in conditional expressions (1) to (7).

Figure 23:
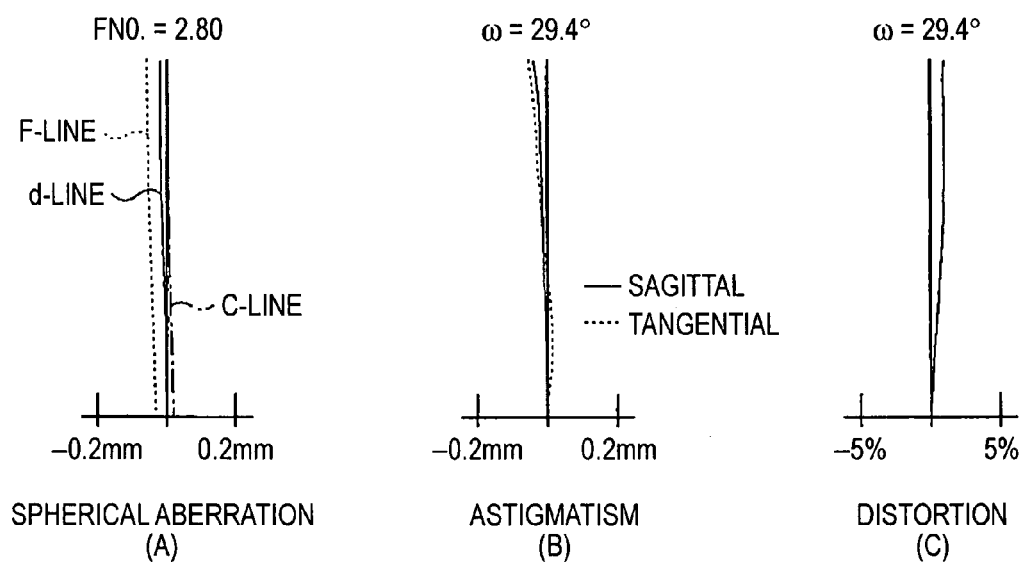
FIG. 23 shows spherical aberration, astigmatism, and distortion in the imaging lens of example 1.
Figure 24:
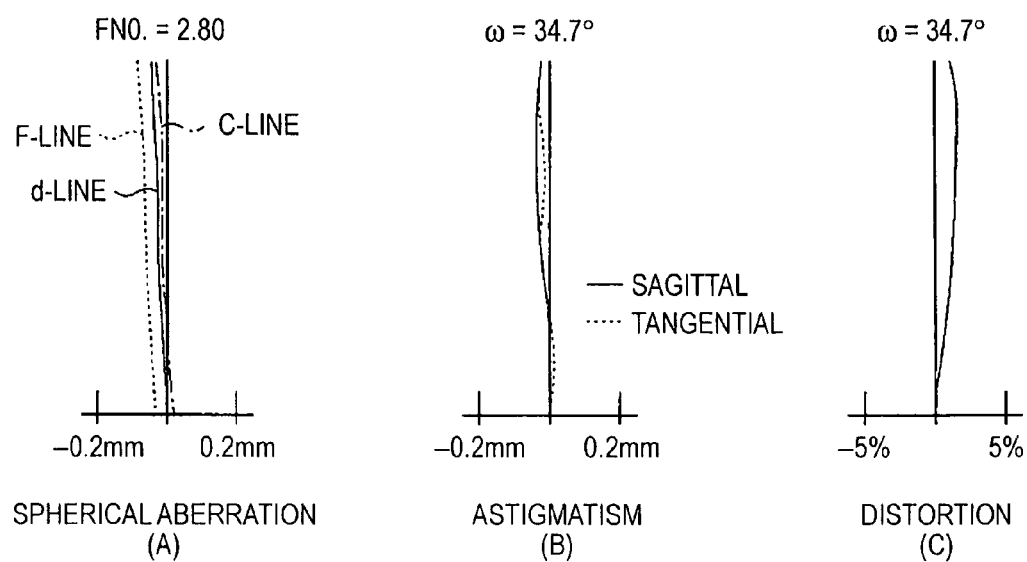
FIG. 24 shows spherical aberration, astigmatism, and distortion in the imaging lens of example 2.
Figure 25:
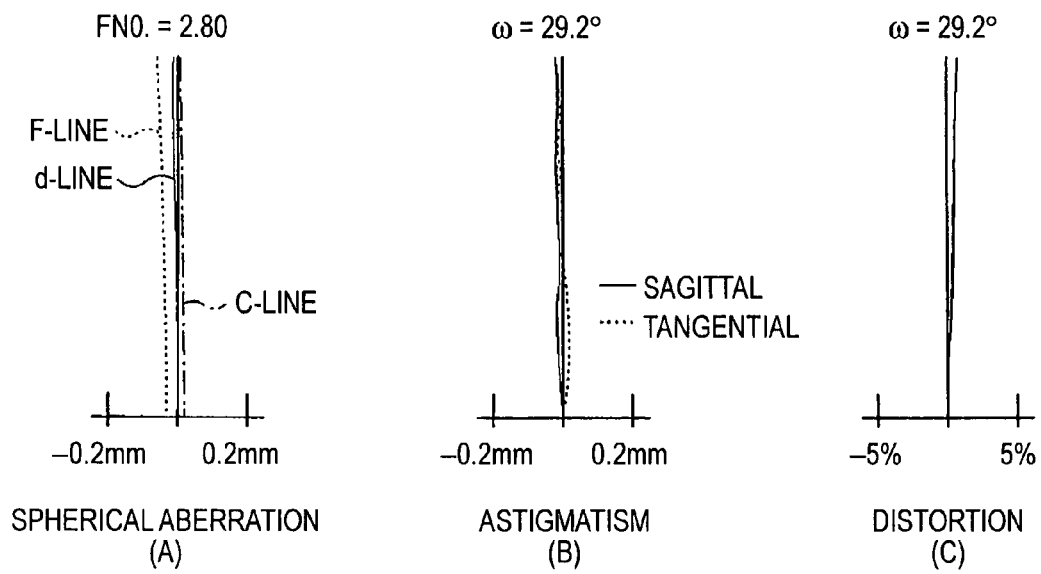
FIG. 25 shows spherical aberration, astigmatism, and distortion in the imaging lens of example 3.
Figure 26:
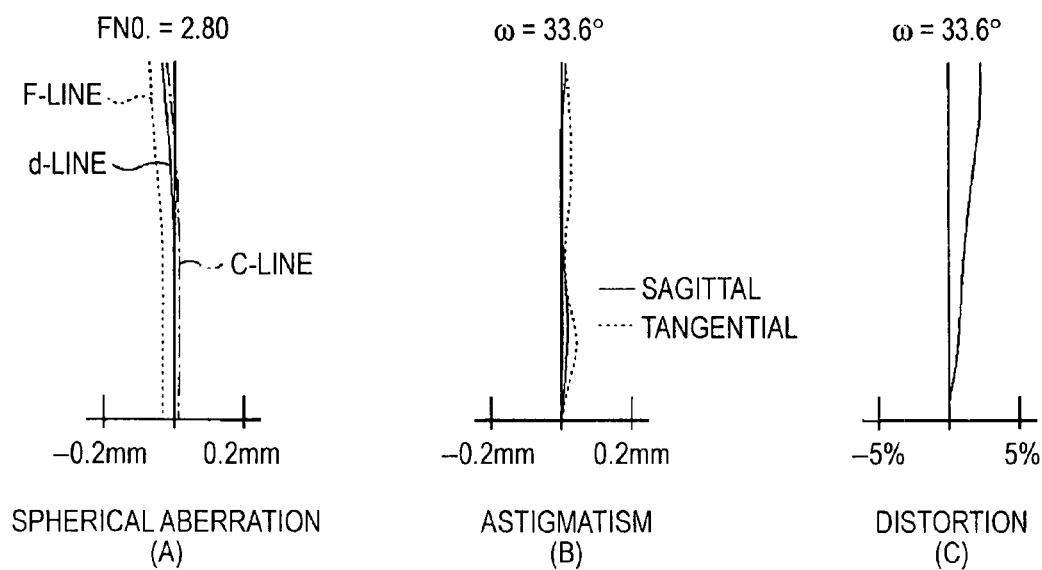
FIG. 26 shows spherical aberration, astigmatism, and distortion in the imaging lens of example 4.
Figure 27:
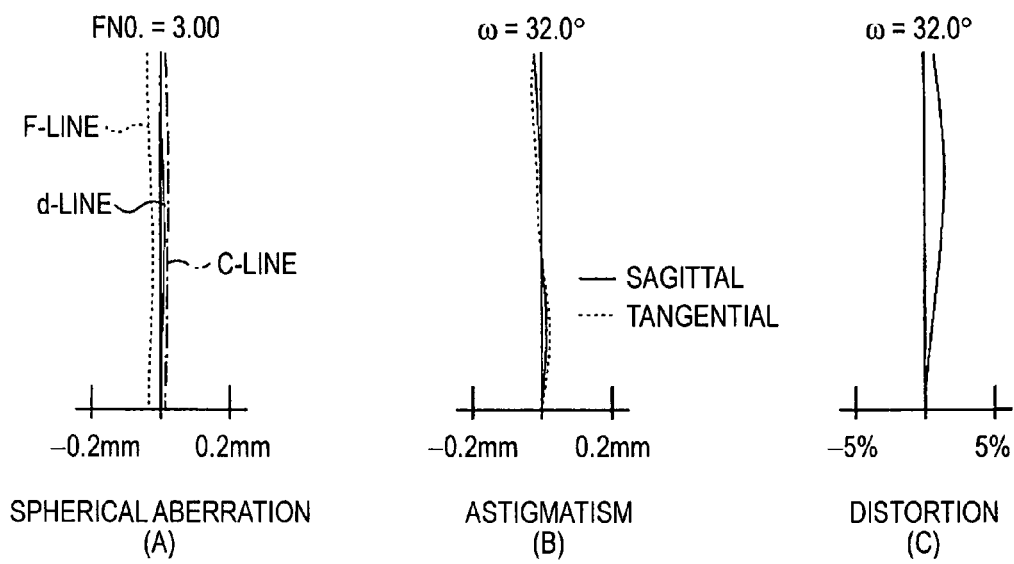
FIG. 27 shows spherical aberration, astigmatism, and distortion in the imaging lens of example 5.
Figure 28:
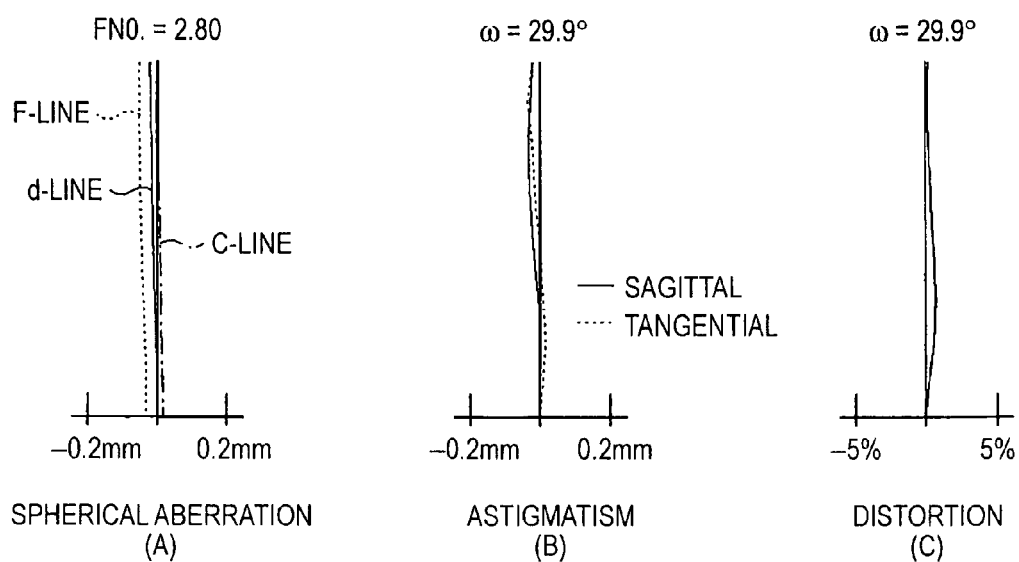
FIG. 28 shows spherical aberration, astigmatism, and distortion in the imaging lens of example 6.
Figure 29:
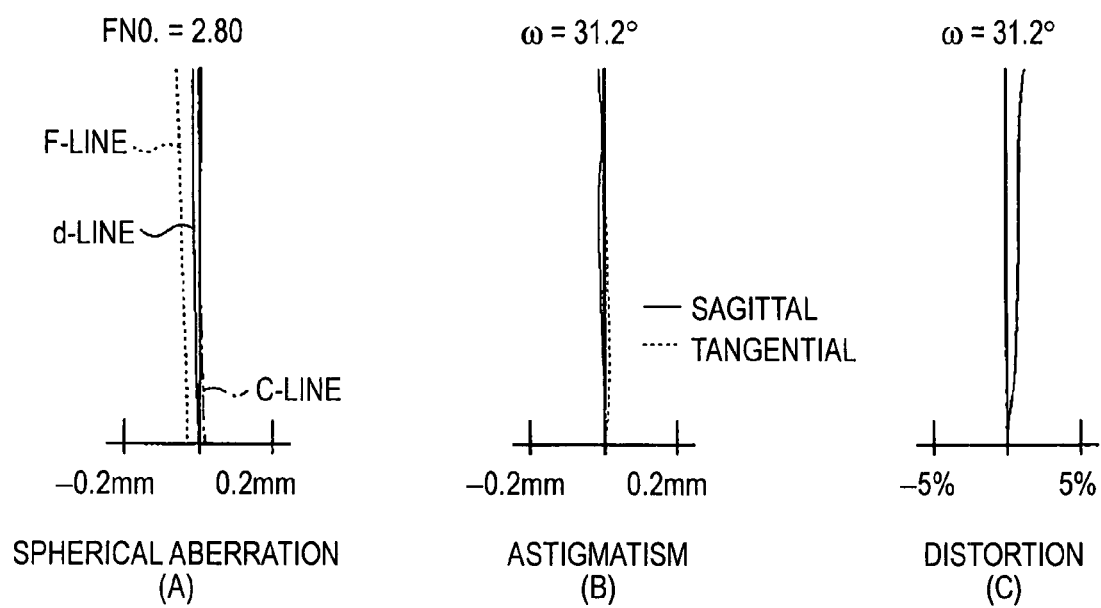
FIG. 29 shows spherical aberration, astigmatism, and distortion in the imaging lens of example 7.

FIGS. 23 (A) to 23 (C) show spherical aberration, astigmatism, and distortion in the imaging lens of example 1. Each aberration drawing shows aberration with d line as the reference wavelength; the spherical aberration drawing also shows aberration at the F-line (wavelength 486.1 nm) and the C-line (wavelength 656.3 nm). In the astigmatism drawing, the solid line indicates aberration in a sagittal direction and the dashed line indicates aberration in a tangential direction. Likewise, FIGS. 24 (A) to 24 (C) show aberrations and distortion for example 2; FIGS. 25 (A) to 25 (C) show aberrations and distortion for example 3; FIGS. 26 (A) to 26 (C) show aberrations and distortion for example 4; FIGS. 27 (A) to 27 (C) show aberrations and distortion for example 5; FIGS. 28 (A) to 28 (C) show aberrations and distortion for example 6; and FIGS. 29 (A) to 29 (C) show aberrations and distortion for example 7.

As seen from the lens data and the aberration drawings, extremely good aberration performance is demonstrated in the examples. Compaction of the full length is also accomplished.

Although the invention has been described in the embodiment and the examples, it is to be understood that the invention is not limited to the specific embodiment or examples thereof and various modifications may be made. For example, the values of the curvature radius, the spacing, and the refractive index of each lens component are not limited to the values shown in the numeric examples and can take any other value. In the embodiment and the examples described above, both surfaces of each of the first lens to the third lens are all aspheric, but the invention is not limited to the mode.

This application claims foreign priority from Japanese Patent Application No. 2006-69226, filed Mar. 14, 2006, the entire disclosure of which is herein incorporated by reference.

What is claimed is:

1. An imaging lens comprising: in order from an object side of the imaging lens,
   a first lens having a convex surface directed to the object side on an optical axis and having a positive power;
   an aperture diaphragm placed between a top position of an object-side surface of the first lens and a position of an image-side surface of the first lens on the optical axis;
   a second lens having a meniscus shape with a concave surface directed to the object side on the optical axis; and
   a third lens having a meniscus shape with a convex surface directed to the object side on the optical axis,
   wherein
   the imaging lens satisfies all conditional expressions (1) to (3) and 7':

$$0.5 < f1/f < 2.0 \quad (1)$$

$$0.5 < (|R2|-R1)/(R1+|R2|) \leq 1.0 \quad (2)$$

$$0.5 < |f2/f| < 3.0 \quad (3)$$

$$v1-v2 \geq 28.2 \quad (7')$$

wherein
   f represents a focal length of the imaging lens;
   f1 represents a focal length of the first lens;
   f2 represents a focal length of the second lens;
   R1 represents a radius of curvature of the object-side surface of the first lens;
   R2 represents a radius of curvature of the image-side surface of the first lens; and
   v1 represents an Abbe number of the first lens; and v2 represents an Abbe number of the second lens.

2. The imaging lens according to claim 1, further satisfying conditional expression (4):

$$0.9 < f3/f < 3.0 \quad (4)$$

wherein f3 represents a focal length of the third lens.

3. The imaging lens according to claim 2, wherein the second lens has a negative power, and the imaging lens satisfies conditional expression (7):

$$v1-v2 > 20 \quad (7)$$

wherein v1 represents an Abbe number of the first lens; and v2 represents an Abbe number of the second lens.

4. The imaging lens according to claim 3, further satisfying conditional expression (5):

$$bf/TL > 0.2 \quad (5)$$

wherein bf represents a distance from the image-side surface of the third lens to an image formation surface in terms of air; and TL represents a distance from the object-side surface of the first lens to the image formation surface in terms of air.

5. The imaging lens according to claim 4, further satisfying conditional expression (6):

$$TL/(2 \times Ih) < 1.2 \quad (6)$$

wherein Ih represents a maximum image height on an image formation surface.

6. The imaging lens according to claim 5, wherein the aperture diaphragm is placed between the top position of the object-side surface of the first lens and an edge position of the object-side surface of the first lens on the optical axis.

7. The imaging lens according to claim 3, wherein the aperture diaphragm is placed between the top position of the object-side surface of the first lens and an edge position of the object-side surface of the first lens on the optical axis.

8. The imaging lens according to claim 2, further satisfying conditional expression (5):

$$bf/TL > 0.2 \quad (5)$$

wherein bf represents a distance from the image-side surface of the third lens to an image formation surface in terms of air; and TL represents a distance from the object-side surface of the first lens to the image formation surface in terms of air.

9. The imaging lens according to claim 8, further satisfying conditional expression (6):

$$TL/(2 \times Ih) < 1.2 \quad (6)$$

wherein Ih represents a maximum image height on an image formation surface.

10. The imaging lens according to claim 9, wherein the aperture diaphragm is placed between the top position of the object-side surface of the first lens and an edge position of the object-side surface of the first lens on the optical axis.

11. The imaging lens according to claim 2, wherein the aperture diaphragm is placed between the top position of the object-side surface of the first lens and an edge position of the object-side surface of the first lens on the optical axis.

12. The imaging lens according to claim 1, wherein the second lens has a negative power, and the imaging lens satisfies conditional expression (7):

$$v1-v2 > 20 \quad (7)$$

wherein v1 represents an Abbe number of the first lens; and v2 represents an Abbe number of the second lens.

13. The imaging lens according to claim 12, further satisfying conditional expression (5):

$$bf/TL > 0.2 \quad (5)$$

wherein bf represents a distance from the image-side surface of the third lens to an image formation surface in terms of air; and TL represents a distance from the object-side surface of the first lens to the image formation surface in terms of air.

14. The imaging lens according to claim 13, further satisfying conditional expression (6):

$$TL/(2 \times Ih) < 1.2 \quad (6)$$

wherein Ih represents a maximum image height on an image formation surface.

15. The imaging lens according to claim 14, wherein the aperture diaphragm is placed between the top position of the object-side surface of the first lens and an edge position of the object-side surface of the first lens on the optical axis.

16. The imaging lens according to claim 12, wherein the aperture diaphragm is placed between the top position of the object-side surface of the first lens and an edge position of the object-side surface of the first lens on the optical axis.

17. The imaging lens according to claim 1, further satisfying conditional expression (5):

$$bf/TL > 0.2 \quad (5)$$

wherein bf represents a distance from the image-side surface of the third lens to an image formation surface in terms of air; and TL represents a distance from the object-side surface of the first lens to the image formation surface in terms of air.

18. The imaging lens according to claim 17, further satisfying conditional expression (6):

$$TL/(2 \times Ih) < 1.2 \quad (6)$$

wherein Ih represents a maximum image height on an image formation surface.

19. The imaging lens according to claim 18, wherein the aperture diaphragm is placed between the top position of the object-side surface of the first lens and an edge position of the object-side surface of the first lens on the optical axis.

20. The imaging lens according to claim 1, wherein the aperture diaphragm is placed between the top position of the object-side surface of the first lens and an edge position of the object-side surface of the first lens on the optical axis.

21. The imaging lens according to claim 1, further satisfying conditional expression (4'):

$$1.7 < f3/f < 3.0 \tag{4'}$$

wherein f3 represents a focal length of the third lens.

22. The imaging lens according to claim 1, wherein the aperture diaphragm is disposed toward the image side with respect to the top position of the object-side surface of the first lens.

\* \* \* \* \*